United States Patent
Opoka et al.

(10) Patent No.: US 10,584,591 B2
(45) Date of Patent: Mar. 10, 2020

(54) ROTOR WITH SUBSET OF BLADES HAVING A CUTOUT LEADING EDGE

(71) Applicants: Rolls-Royce Deutschland Ltd & Co KG, Blankenfelde-Mahlow (DE); Rolls-Royce plc, London (GB)

(72) Inventors: Maciek Opoka, Berlin (DE); Thomas Giersch, Koenigs Wusterhausen (DE); Bernhard Mueck, Berlin (DE); John Dodds, London (GB); Chris Hall, London (GB)

(73) Assignees: Rolls-Royce Deutschland Ltd & Co KG, Blankenfelde-Mahlow (DE); Rolls-Royce plc, London (GB)

( * ) Notice: Subject to any disclaimer, the term of this patent is extended or adjusted under 35 U.S.C. 154(b) by 0 days.

(21) Appl. No.: 16/031,340

(22) Filed: Jul. 10, 2018

(65) Prior Publication Data
US 2019/0017385 A1    Jan. 17, 2019

(30) Foreign Application Priority Data
Jul. 14, 2017 (DE) .......... 10 2017 115 853

(51) Int. Cl.
*F01D 5/14* (2006.01)
*F04D 29/32* (2006.01)
*F04D 29/66* (2006.01)

(52) U.S. Cl.
CPC .......... *F01D 5/142* (2013.01); *F01D 5/141* (2013.01); *F04D 29/324* (2013.01);
(Continued)

(58) Field of Classification Search
CPC .... F04D 29/324; F04D 29/327; F04D 29/328; F04D 29/666; F01D 5/10; F01D 5/141;
(Continued)

(56) References Cited

U.S. PATENT DOCUMENTS 3,347,520 A * 10/1967 Oweczarek .............. F01D 5/14
                                                                415/119
6,428,278 B1   8/2002 Montgomery et al.
(Continued)

FOREIGN PATENT DOCUMENTS

DE    102011054589 A1    4/2012
EP       1211383 A2      6/2002
(Continued)

OTHER PUBLICATIONS

Department of the Army. Aviation Unit and Aviation Intermediate Maintenance Manual: Engine, Aircraft, Gas Turbine, Model T63-A-720, P/N6887191, NSN 2840-01-013-1339 Department of the Army technical manual, 1977. accessed from https://books.google.com/books?id=r5E8TviQyhQC (Year: 1977).*

(Continued)

*Primary Examiner* — Moshe Wilensky
*Assistant Examiner* — Topaz L. Elliott
(74) *Attorney, Agent, or Firm* — Shuttleworth & Ingersoll, PLC; Timothy Klima

(57) ABSTRACT

A rotor of a turbomachine includes a plurality of rotor blades, which each have a blade leading edge and a tip, the rotor blades forming a first group and at least one further group of rotor blades of different construction. It is provided that the rotor blades of the first group are nominal rotor blades, the rotor blades of the at least one further group each have a material cutout in the transition from the blade leading edge to the tip, the material cutout not being present in the case of the rotor blades of the first group, and the rotor blades of the first group and of the at least one further group form a non-periodic sequence in a circumferential direction.

19 Claims, 6 Drawing Sheets

(52) U.S. Cl.
CPC ......... *F04D 29/327* (2013.01); *F04D 29/666* (2013.01); *F05D 2220/32* (2013.01); *F05D 2240/303* (2013.01); *F05D 2240/307* (2013.01); *F05D 2250/11* (2013.01); *F05D 2250/14* (2013.01); *F05D 2250/141* (2013.01); *F05D 2260/961* (2013.01)

(58) Field of Classification Search
CPC .. F01D 5/16; F05D 2260/91; F05D 2240/302; F05D 2240/303; F05D 2250/14; F05D 2250/141
USPC .................................................. 416/203, 228
See application file for complete search history.

(56) References Cited

U.S. PATENT DOCUMENTS

| | | | | |
|---|---|---|---|---|
| 7,351,039 | B2* | 4/2008 | Bachofner | F01D 5/141 |
| | | | | 416/223 A |
| 7,766,726 | B2* | 8/2010 | Sherlock | B23C 3/18 |
| | | | | 451/121 |
| 9,297,259 | B2* | 3/2016 | Miller | F01D 5/141 |
| 2010/0247310 | A1 | 9/2010 | Kelly et al. | |
| 2012/0099995 | A1 | 4/2012 | Delvaux et al. | |
| 2014/0377075 | A1 | 12/2014 | Warikoo et al. | |
| 2015/0198047 | A1* | 7/2015 | Roche | F01D 5/16 |
| | | | | 60/805 |
| 2016/0290137 | A1* | 10/2016 | Li | F04D 29/324 |
| 2016/0333894 | A1* | 11/2016 | K | F04D 29/542 |
| 2017/0241432 | A1* | 8/2017 | Theratil | F02K 3/06 |

FOREIGN PATENT DOCUMENTS

| | | |
|---|---|---|
| EP | 1813773 A2 | 8/2007 |
| EP | 3075955 A1 | 10/2016 |
| EP | 3208467 A1 | 8/2017 |
| JP | H06248902 A | 9/1994 |

OTHER PUBLICATIONS

European Search Report dated Nov. 13, 2018 for counterpart European Patent Application No. 18181147.
German Search Report dated May 24, 2018 for counterpart German Patent Application No. 10 2017 115 853.7.
Figaschewsky, Felix [u.a.]: Design and analysis of an intentional mistuning experiment reducing flutter susceptibility and minimizing forced response of a jet engine fan. In: Proceedings of the ASME Turbo Expo: Turbine Technical Conference and Exposition—2017: Jun. 26-30, 2017, Charlotte, North Carolina, USA, vol. 7B, 2017, S. V07BT36A020-1-V07BT36A020-13.

\* cited by examiner

ROTOR WITH SUBSET OF BLADES HAVING A CUTOUT LEADING EDGE

This application claims priority to German Patent Application DE102017115853.7 filed Jul. 14, 2017, the entirety of which is incorporated by reference herein.

The invention relates to a rotor of a turbomachine according to the present disclosure.

It is known to actively mistune rotors of turbomachines, i.e. to subject the rotor blades to targeted deviations in the blade natural frequencies in addition to manufacturing-related, and thus random, deviations in the blade natural frequencies. By way of example, to realize targeted mistuning in the case of a rotor having an even number of rotor blades, it is known from U.S. Pat. No. 6,428,278 B1 to alternately form material cutouts at the tip and in the region of the leading edge of the individual rotor blades. The targeted mistuning of a rotor reduces certain vibration excitations of the rotor.

The present invention is based on the object of providing a rotor which is susceptible only to a small degree to vibration excitations.

This object is achieved by a rotor having features as disclosed herein. Embodiments of the invention are disclosed herein.

Accordingly, the invention considers a rotor which is non-periodically mistuned in the region of its tips. In this respect, the rotor blades form at least two groups of rotor blades which are of different construction or which have a different geometry. Apart from manufacturing tolerances, the rotor blades of a group here are of identical construction. The constructionally different design of the rotor blades has the effect that the rotor blades of the different groups differ in terms of the position of at least one of their natural frequencies.

The invention provides that the rotor blades of a first group are nominal rotor blades and the rotor blades of at least one further group each have a material cutout in the transition from the blade leading edge to the tip, said material cutout not being present in the case of the rotor blades of the first group. It is moreover provided that the rotor blades (i.e. the rotor blades of the first group and of the at least one further group) form a non-periodic sequence in the circumferential direction.

The invention is based on the knowledge that a blade excitation can be suppressed by virtue of the fact that rotor blades of different groups or with different natural frequencies are arranged non-periodically in the circumferential direction of the rotor. By virtue of a non-periodically alternating distribution of different tips, the different nature of which arising from the fact that the rotor blades of at least one group have a material cutout in the transition from the blade leading edge to the tip, the invention makes it possible to optimize the frequency mistuning of the rotor in such a manner that maximum aerodynamic damping can be achieved.

In particular, the invention avoids or reduces conventional flutter, and also stall flutter. In the case of stall flutter, unstable local cells in which the flow locally stalls are formed at the tips of the rotor blades. In the rotating reference system, these cells can migrate in the circumferential direction counter to the direction of rotation of the blade wheel. This should be avoided, since such a phenomenon can lead to undesired resonances of the fundamental blade modes. The non-periodic aerodynamic variation which is provided by the invention influences the characteristics of the flow separation which occurs locally at the respective tips. The flow separation thus differs in its frequency and radial extent in the event of critical incident flow. This aerodynamic variation in the circumferential direction prevents the formation of rotating coherent stall patterns which are able to excite the fundamental blade modes to vibrate. The differently formed leading edges make it possible to keep the performance of the rotor stage, expressed by total pressure increase and efficiency, at a high level. The solution according to the invention thus suppresses the formation of coherent separation processes at the blade tip, and at the same time maximizes the aerodynamic damping by the frequency mistuning of the overall structure.

The solution according to the invention has the effect in this respect that the formation of rotating coherent stall patterns can be prevented over the entire operating range of the compressor, in which the rotor formed in accordance with the invention is formed, in particular also in part-load operation.

For the purposes of the present invention, "non-periodicity" means in particular that the rotor blades of the groups which are present are not arranged exclusively in an alternating manner, according to the pattern ABAB . . . in the case of two groups of rotor blades, according to the pattern ABCABC . . . in the case of three groups of rotor blades, according to the pattern ABCDABCD . . . in the case of four groups of rotor blades, etc. Rotors having an uneven number of rotor blades are always non-periodic when they comprise rotor blades of more than one group.

It is pointed out that the term "material cutout" refers comparatively to a rotor blade in which such a material cutout is not present. Of the at least two groups of rotor blades, one (the first) group represents such a reference. When a group of rotor blades thus has rotor blades with material cutouts, the rotor blades of this group differ from the rotor blades of the first group in that they realize material cutouts where the rotor blades of the first group have material. The rotor blades of the first group are referred to as nominal rotor blades. Compared to a rotor blade of the first group, which serves as reference blade, a rotor blade with a material cutout is cut back with respect to the reference blade in the region of the material cutout, and therefore is modified in external circumference or contour and reduced in material.

The material cutout in the transition from the blade leading edge to the tip, which the rotor blades of at least one group form, can also be referred to as a cut-back section on the leading edges of the blade tips of the rotor blades. In this respect, it is the case that the greater the material cutout or the cut-back section, the greater too the gap between the outer boundary of the annular space, in which the rotor rotates, and the leading edge of the rotor blades. Accordingly, the length of the profile chord of the rotor blade is shortened in the region of a material cutout or of a cut-back section with an increasing radius.

It is furthermore pointed out that a group of rotor blades can have one or more rotor blades. Even only a constructionally different rotor blade having at least one natural frequency which differs from the natural frequencies of the other rotor blades of the rotor thus forms a group of rotor blades for the purposes of the present invention.

According to one embodiment of the invention, a rotor blade having a material cutout differs from a nominal rotor blade only in terms of the material cutout, i.e. the rotor blades are of identical construction except for the material cutout (and apart from manufacturing tolerances). This is not necessarily the case, however.

One embodiment of the invention provides that the rotor blades form two groups of different construction, the rotor blades of the first group being nominal rotor blades which do not have any material cutouts in the transition from the blade leading edge to the tip, and the rotor blades of the second group being rotor blades which have material cutouts in the transition from the blade leading edge to the tip. With rotor blades of two groups, it is possible to realize, for example, non-periodic structures of the form ABABABB or ABABABBA, where A denotes blades of the first group and B denotes blades of the second group.

A further embodiment of the invention provides that the rotor blades form n groups, n≥3, of different construction, the rotor blades of the first group being nominal rotor blades which do not have any material cutouts in the transition from the blade leading edge to the tip, and the rotor blades of each further group being rotor blades which have material cutouts in the transition from the blade leading edge to the tip, the shape and/or dimension of the material cutout of the rotor blades being different in the case of each of the further groups. For the case where n=3, it is possible to realize, for example, non-periodic structures of the form ACBBACB, ABCABCB, ABABABAC or ABCABCAC, where A denotes blades of the first group, B denotes blades of the second group, and C denotes blades of the third group.

According to an embodiment variant, the groups of rotor blades with material cutouts differ by virtue of the fact that the respective rotor blades, with respect to the radial direction of the rotor blades, have a differently steep profile of the leading edge in the region of the material cutout. The cut-back section, which is provided by the material cutouts, thus has a differently steep profile.

In this respect, it can be provided according to an exemplary embodiment that the rotor blades form three groups of different construction, the rotor blades of the first group being nominal rotor blades which do not have any material cutouts in the transition from the blade leading edge to the tip, and the rotor blades of the second and third group being rotor blades which have material cutouts in the transition from the blade leading edge to the tip. In this respect, the material cutouts, with respect to the radial direction, have a steeper profile of the leading edge in the case of the rotor blades of the second group than the rotor blades of the third group.

According to an embodiment variant, the material cutouts at least approximately have the shape of a triangle in side view, the longest side of the triangle forming the leading edge of the blade in the region of the material cutout.

Embodiments of the invention provide that, in addition to the material cutouts which they partially form, the rotor blades differ in terms of the shape of the leading edge in the region of the material cutout. It can thus be provided that, in the case of at least one group of rotor blades with material cutouts, the shape of the leading edge in the region of the material cutout deviates from the shape of the leading edge outside the material cutout.

In this respect, in one embodiment variant, the shaping of the leading edge is combined with the material cutouts in such a manner that, in the case of two considered groups of rotor blades with material cutouts, a flatter leading edge shape is formed in the case of the group which has a lesser steepness of the profile of the leading edge in the region of the material cutout. In other words, the greater the steepness of the profile of the leading edge (i.e. the more the leading edge profile corresponds to that of the nominal rotor blade), the lesser the extent to which the leading edge is additionally flattened.

The leading edge shape, which the leading edge has in the region of the material cutout, can have different embodiments. According to a first exemplary embodiment, the leading edge has a semicircular form in the region of the material cutout, whereas it has an elliptical form in the region outside the material cutout. According to a second exemplary embodiment, the leading edge has an obtuse form in the region of the material cutout, whereas it has an elliptical form in the region outside the material cutout. According to a third exemplary embodiment, the leading edge has an elliptical form in the region of the material cutout and in the region outside the material cutout, the ratio of major axis to minor axis being greater in the region of the material cutout than in the region outside the material cutout, such that the elliptical form is flattened to a greater extent in the region of the material cutout.

Moreover, it can be provided that, in the case of at least one group of rotor blades with material cutouts, the leading edge shape becomes increasingly flatter with a decreasing length of the profile chord of the blade profile (i.e. towards the tip) in the region of the material cutout. This aspect of the invention thus considers a variation in the shape of the leading edge within a rotor blade, and not with respect to the rotor blades of different groups.

In principle, the present invention considers any desired circumferential distributions of the rotor blades, as long as the rotor blades of the at least two groups are arranged non-periodically in the circumferential direction. In this respect, it can be provided that the rotor has an uneven number of blades or that the rotor has an even number of blades. In both cases, it is possible to realize a non-periodic sequence of the blades of the at least two groups in a variety of ways.

Thus, one embodiment of the invention provides that the rotor has an uneven number of blades, the non-periodic sequence of the rotor blades of the at least two groups being formed by a quasi-periodic sequence which is periodic apart from a break in symmetry. There is therefore a lack of symmetry only in the region of the break in symmetry, while the sequence of the rotor blades is otherwise periodic. If the rotor has two groups of rotor blades, and in this case an uneven number of blades, a break in symmetry can be formed, for example, by virtue of the fact that two blades of a group directly follow one another at least once. One example of this is the blade sequence ABABABB, where A denotes blades of the first group and B denotes blades of the second group.

A further embodiment of the invention provides that the rotor has two groups of rotor blades and an even number of blades, the non-periodic sequence of the rotor blades of the two groups being formed by at least one deviation from an alternating sequence. An example of this is the blade sequence ABABABBA, where A denotes blades of the first group and B denotes blades of the second group.

The mistuning according to the invention of a rotor is advantageous particularly in the case of rotors which have only little damping in the transition between blade and rotor hub. In particular, there is little damping in the transition between blade and rotor hub if the rotor is of BLISK design, for which case the rotor disk, the rotor hub and the rotor blades have an integral form (BLISK="Blade Integrated Disk"), or if the rotor is of BLING design, for which case the rotor hub and the rotor blades have an integral form (BLING="Blade Integrated Ring"). Accordingly, it is provided in embodiments of the invention that the rotor is formed with a BLISK design or with a BLING design, where, for the purposes of this description, both of these variants are referred to as "BLISK design" for the sake of simplicity. Rotors formed with a BLISK design are more sensitive to vibration excitation than conventional rotors.

According to one embodiment of the invention, the rotor under consideration is a fan, for example the fan of a turbofan engine. According to a further embodiment, the rotor under consideration is a rotor of a compressor input stage of a compressor formed with a BLISK design, for example of a high-pressure compressor or of a medium-pressure compressor.

The turbomachine in which the rotor provided with a mistuning pattern according to the invention is used is, for example, a gas turbine, in particular an aircraft gas turbine, for example a turbofan engine.

A further aspect of the invention considers a rotor of BLISK design of a turbomachine, which has:
- an uneven number of rotor blades, which each have a blade leading edge and a tip,
- the rotor blades forming a first group and at least one further group of rotor blades of different construction,
- the rotor blades of the first group being nominal rotor blades,
- the rotor blades of the at least one further group each having a material cutout in the transition from the blade leading edge to the tip, said material cutout not being present in the case of the rotor blades of the first group, and
- the rotor blades of the first group and of the at least one further group forming a non-periodic sequence in the circumferential direction.

A further aspect of the invention considers a rotor of BLISK design of a turbomachine, which has:
- a plurality of rotor blades, which each have a blade leading edge and a tip,
- the rotor blades forming a first group and at least two further groups of rotor blades of different construction,
- the rotor blades of the first group being nominal rotor blades,
- the rotor blades of the at least two further groups each having a material cutout in the transition from the blade leading edge to the tip, said material cutout not being present in the case of the rotor blades of the first group,
- the rotor blades of the first group and of the at least two further groups forming a non-periodic sequence in the circumferential direction, and
- the groups of rotor blades with material cutouts differing by virtue of the fact that the respective rotor blades, with respect to the radial direction, have a differently steep profile of the leading edge in the region of the material cutout.

It is pointed out that the present invention is described with respect to a cylindrical coordinate system having the coordinates x, r and φ. In this case, x denotes the axial direction, r denotes the radial direction, and φ denotes the angle in the circumferential direction. The axial direction here is identical to the machine axis of the turbofan engine or of the turbomachine in which the invention is realized.

The invention will be explained in more detail hereinbelow with reference to the figures of the drawing and on the basis of a plurality of exemplary embodiments. In the drawing.

Figure 4:
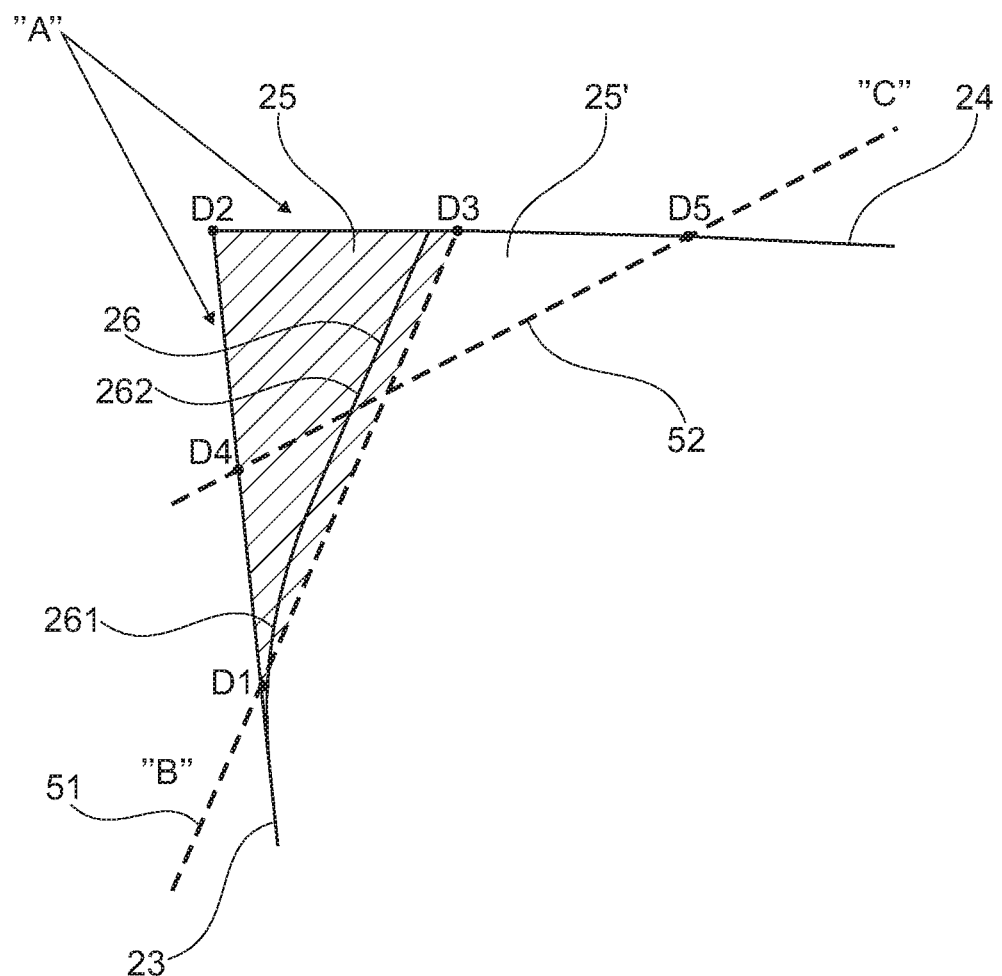
Figure 5:
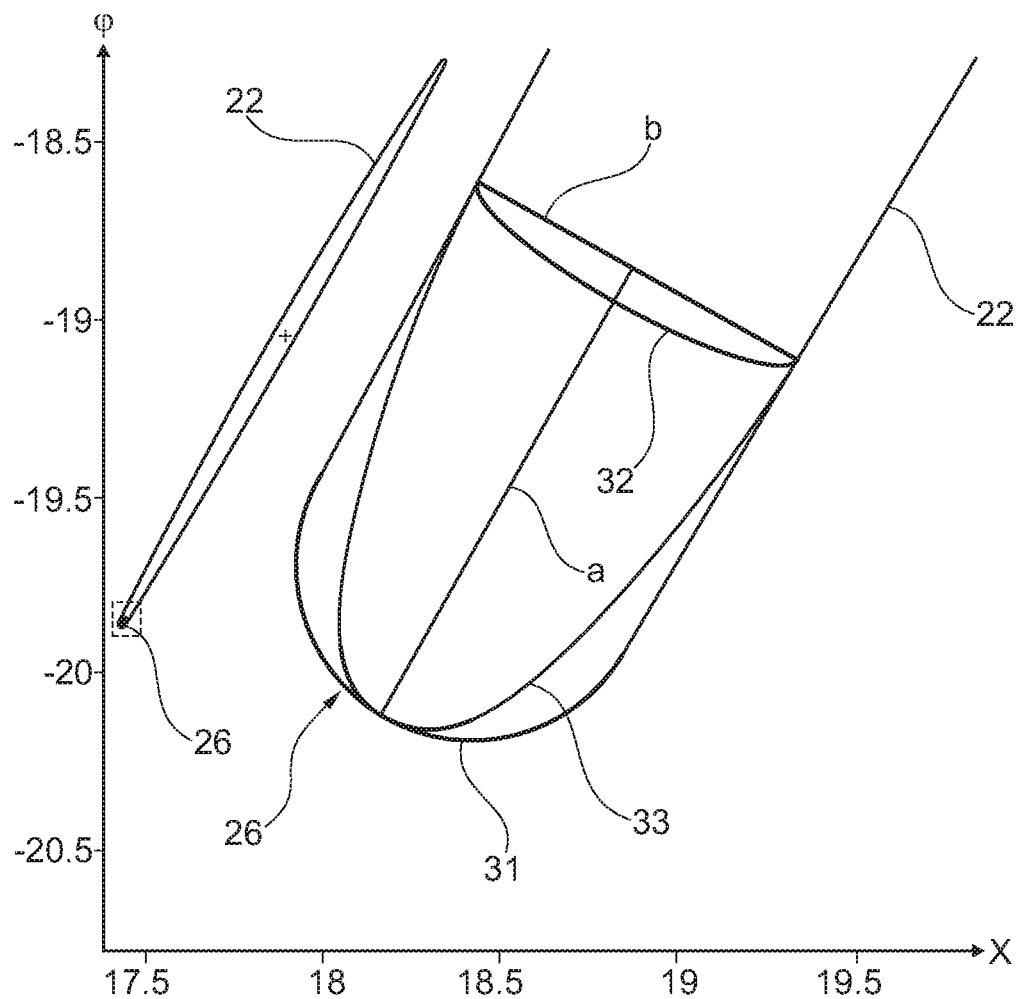
Figure 6:
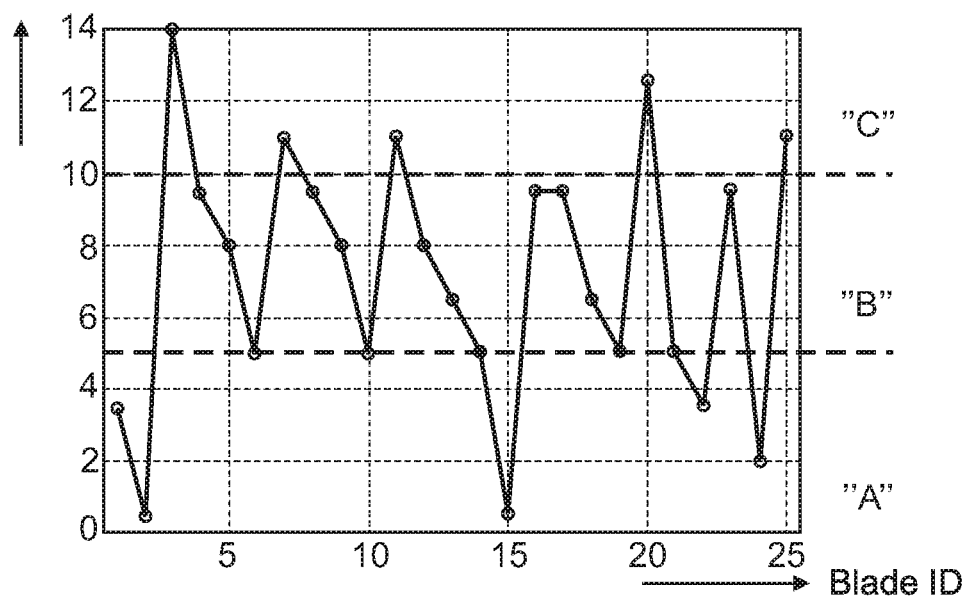
Figure 7:
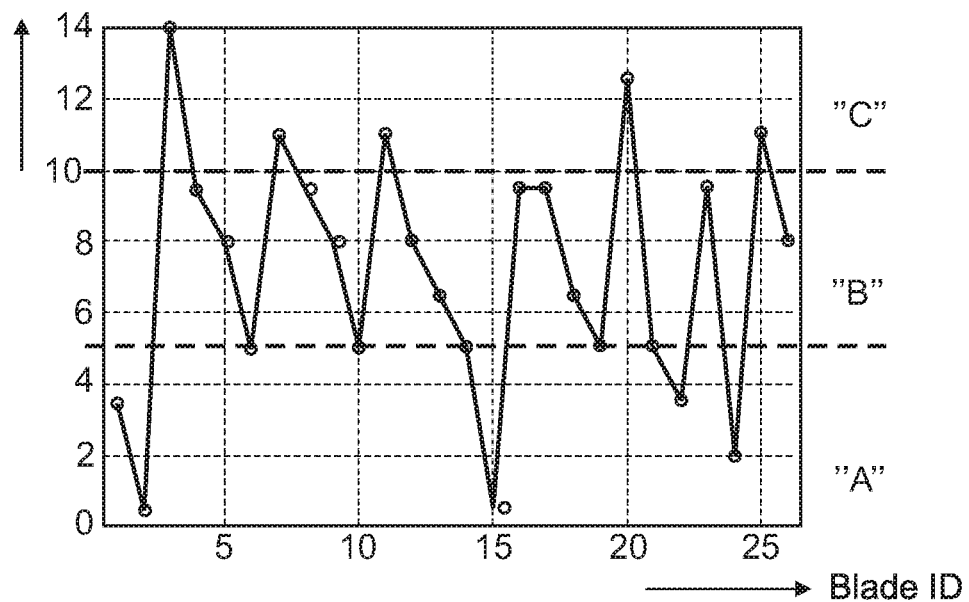

FIG. 4 schematically shows three exemplary embodiments for the shaping of a rotor blade in the transition from the blade leading edge to the tip;

FIG. 5 schematically shows three exemplary embodiments for the shape of the leading edge of a rotor blade in the region of a material cutout;

FIG. 6 shows a graph which depicts a mistuning of the rotor blades for each rotor blade of a rotor having an uneven number of rotor blades, the rotor blade forming in total fourteen different blade variants or mistuning patterns; and FIG. 7 shows a graph which depicts a mistuning of the rotor blades for each rotor blade of a rotor having an even number of rotor blades, the rotor blade forming in total fourteen different blade variants or mistuning patterns.

Figure 1:
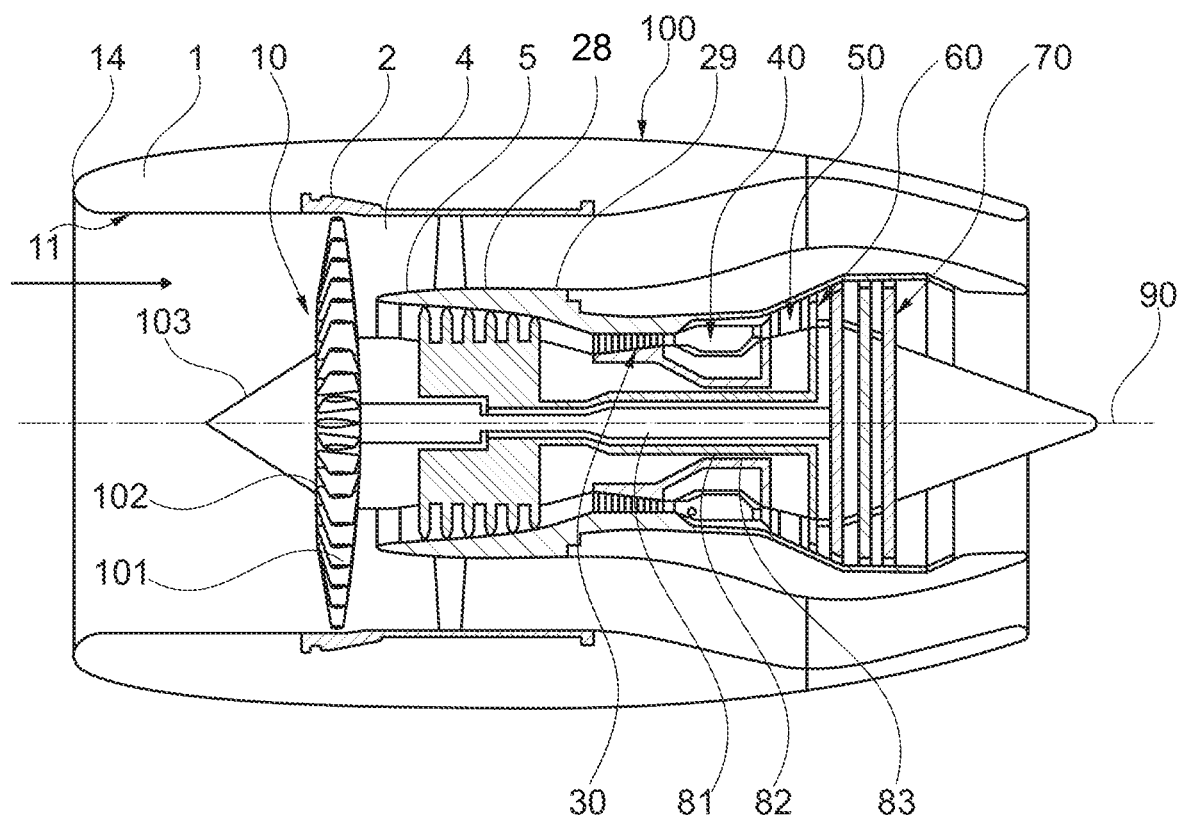
FIG. 1 shows a simplified schematic sectional illustration of a turbofan engine in which the present invention can be realized.

FIG. 1 schematically shows a turbofan engine 100, which has a fan stage with a fan 10 as low-pressure compressor, a medium-pressure compressor 28, a high-pressure compressor 30, a combustion chamber 40, a high-pressure turbine 50, a medium-pressure turbine 60 and a low-pressure turbine 70.

The medium-pressure compressor 28 and the high-pressure compressor 30 each have a plurality of compressor stages each comprising a rotor and a stator. The turbofan engine 100 shown in FIG. 1 moreover has three separate shafts, a low-pressure shaft 81, which connects the low-pressure turbine 70 to the fan 10, a medium-pressure shaft 82, which connects the medium-pressure turbine 60 to the medium-pressure compressor 28, and a high-pressure shaft 83, which connects the high-pressure turbine 50 to the high-pressure compressor 30. This is merely to be understood as exemplary, however. If, for example, the turbofan engine does not have a medium-pressure compressor and does not have a medium-pressure turbine, only a low-pressure shaft and a high-pressure shaft would be present.

The turbofan engine 100 has an engine nacelle 1 (also referred to as engine cowling), which comprises an intake lip 14 and on the inner side forms an engine intake 11, which feeds inflowing air to the fan 10. The fan 10 has a plurality of fan blades 101, which are connected to a fan disk 102. The annulus of the fan disk 102 here forms the radially inner boundary of the flow path through the fan 10. Radially on the outside, the flow path is delimited by a fan casing 2. A nose cone 103 is arranged upstream of the fan disk 102.

Downstream of the fan 10, the turbofan engine 100 forms a secondary flow duct 4 and a primary flow duct 5. The primary flow duct 5 leads through the core engine (gas turbine), which comprises the medium-pressure compressor 28, the high-pressure compressor 30, the combustion chamber 40, the high-pressure turbine 50, the medium-pressure turbine 60 and the low-pressure turbine 70. In this case, the medium-pressure compressor 28 and the high-pressure compressor 30 are surrounded by a circumferential casing 29, this forming on the inner side an annular space area which delimits the primary flow duct 5 radially on the outside. Radially on the inside, the primary flow duct 5 is delimited by corresponding rim surfaces of the rotors and stators of the respective compressor stages, or by the hub or elements of the corresponding drive shaft which are connected to the hub.

During operation of the turbofan engine 100, a primary flow flows through the primary flow duct 5, which is also referred to as the main flow duct. The secondary flow duct 4, which is also referred to as the bypass duct, guides air taken in by the fan 10 during operation of the turbofan engine 100 past the core engine.

The described components have a common rotational or machine axis 90. The rotational axis 90 defines an axial direction of the turbofan engine. A radial direction of the turbofan engine runs perpendicular to the axial direction.

Figure 2:
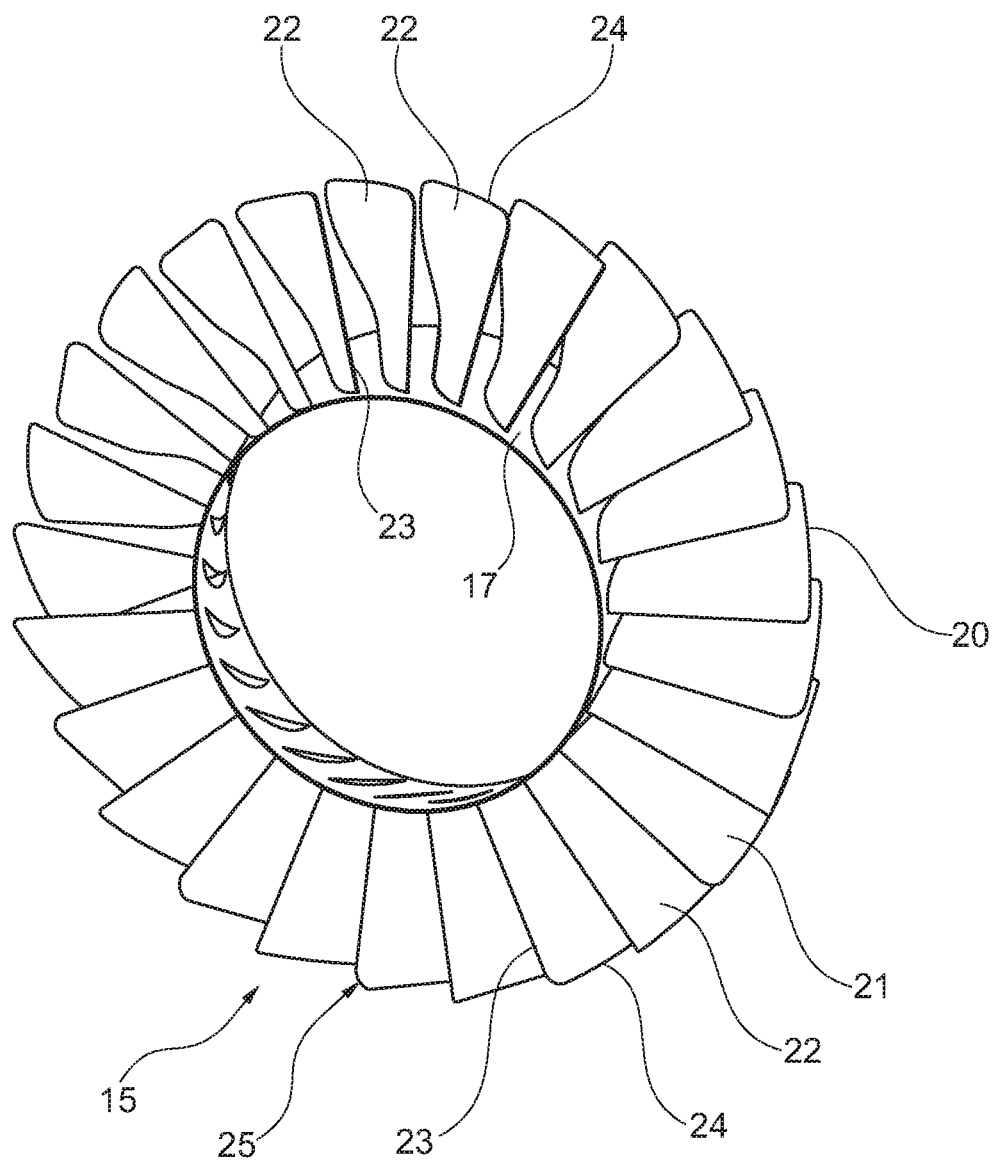
FIG. 2 shows an exemplary embodiment of a rotor of a compressor which has a non-periodic mistuning.

FIG. 2 shows, by way of example, a rotor of BLISK design, which, for example, is the rotor of the first stage of the high-pressure compressor 30 or the rotor of the first stage of the medium-pressure compressor 28. The principles of the present invention apply similarly to any desired rotors, however, in particular also to a fan 10 of BLISK design.

In FIG. 2, the rotor 15 is shown in a perspective view obliquely from the front. It has a rotor hub 17, which radially inwardly delimits the flow duct through the rotor 15. The rotor 15 furthermore comprises a blade ring 20, which comprises a plurality of, twenty five in the example shown, rotor blades 21, 22 arranged in the circumferential direction. The individual rotor blades 21, 22 are arranged equidistantly here in the circumferential direction, this not necessarily being the case. The rotor 15 is of BLISK design, and therefore the rotor hub 17 and blade ring 20 have an integral form. The rotor 15 may moreover comprise a rotor disk (not shown). Each rotor blade 21, 22 has a blade leading edge 23 and a tip 24. The tip 24 runs substantially in a straight line.

The rotor blades 21, 22 form two groups which differ in construction, i.e. in their geometry. Thus, the rotor blades 21 form a first group of rotor blades, which do not have any material cutouts in the region of the blade leading edge 23 and which are also referred to hereinbelow as nominal rotor blades. Here, the blade leading edge 23 and the tip 24 converge in an acute manner.

Furthermore, the rotor blades 22 form a second group of rotor blades which each have—compared to the rotor blades 22 of the first group—a material cutout 25 in the transition from the blade leading edge 23 to the tip 24. Accordingly, the rotor blades 22 have a cut-back section adjoining the tip 24. Otherwise, the rotor blades 21 of the first group and the rotor blades of the second group have an identical geometry. On account of the material cutout 25, the rotor blades 22 of the second group have less material, and are accordingly lighter, compared to the rotor blades 21 of the first group. This has the effect that at least one of the natural frequencies of the rotor blades 22 of the second group rises compared to the corresponding natural frequency of the rotor blades 21 of the first group. The rotor blades 21, 22 of the two groups are thus mistuned with respect to one another. The deviation in at least one natural frequency between rotor blades 21, 22 lies, for example, in a range of between 1% and 3% with respect to the rotor blade 21 of the first group.

Moreover, it is provided that the rotor blades 21, 22 form a non-periodic sequence in the circumferential direction. In principle, the lack of periodicity can be realized in various ways. In this context, a lack of periodicity means that the sequence of the rotor blades 21, 22 has to have at least one break in symmetry. In the exemplary embodiment shown, this is realized by virtue of the fact that—given an otherwise alternating and thus symmetrical sequence of the rotor blades 21, 22—two rotor blades 22 of the second group are arranged directly alongside one another in the upper region of the rotor 15 in FIG. 2. In the case of the rotor shown, this break in symmetry is compulsory, since said rotor comprises an uneven number of rotor blades. Correspondingly, a break in symmetry could also be achieved, however, in the case of a rotor with an even number of rotor blades.

There are of course a large number of possible ways in which, by means of two groups of rotor blades 21, 22, non-periodic sequences of the rotor blades of the two groups can be realized, with the number of these possibilities increasing with the overall number of the rotor blades 21, 22. The selection of a non-periodic sequence which is advantageous for a specific application can be made, for example, using an optimization method. A suitable optimization method is described, for example, in the publication F. Figaschewsky et al.: "DESIGN AND ANALYSIS OF AN INTENTIONAL MISTUNING EXPERIMENT REDUCING FLUTTER SUSCEPTIBILITY AND MINIMIZING FORCED RESPONSE OF A JET ENGINE FAN", Proceedings of ASME Turbo Expo 2017: Turbomachinery Technical Conference and Exposition GT 2017, Jun. 26-30, 2017, Charlotte, USA.

Figure 3:
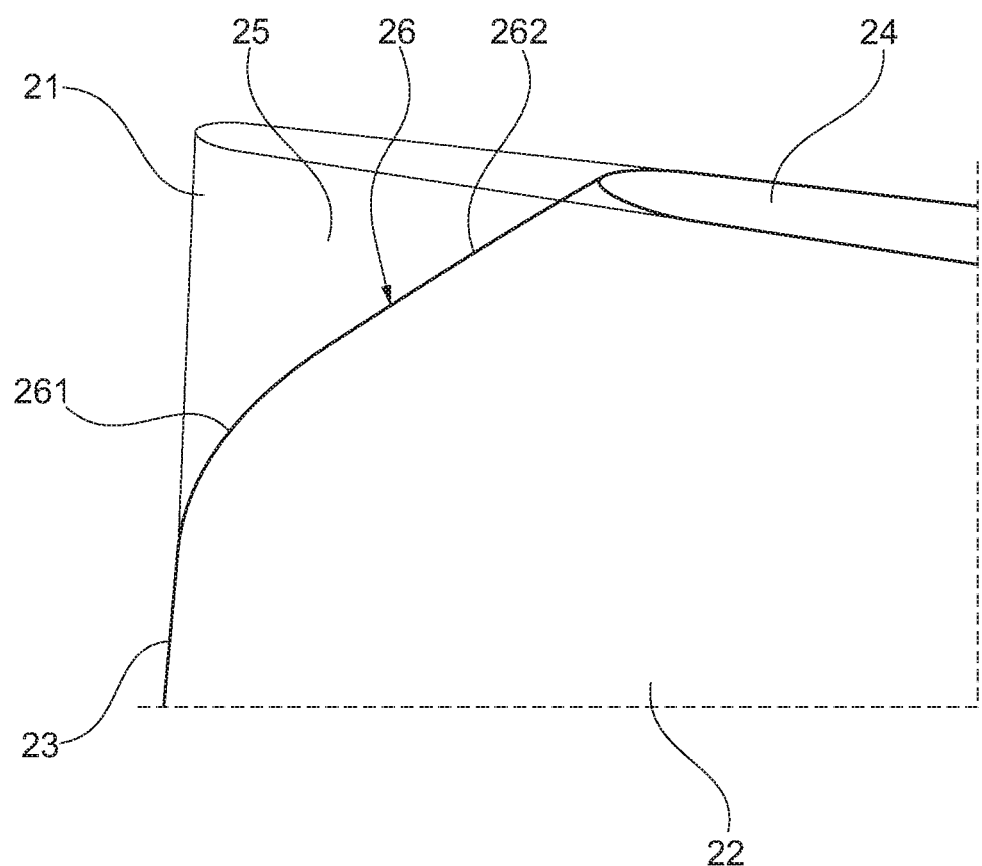
FIG. 3 shows a rotor blade of the rotor shown in FIG. 1 which is provided with a material cutout in the transition from the blade leading edge to the tip.

FIG. 3 shows the transition region between the blade leading edge 23 and the tip 24 of a rotor blade 22 of the second group of FIG. 2 in an enlarged illustration. According to said figure, the rotor blade 22 forms a material cutout 25 in a transition region from the blade leading edge 23 to the tip 24, said material cutout being filled with material in the case of the rotor blade 21 of the first group which is likewise shown. Accordingly, the leading edge 23 is cut back in the region of the material cutout 25, and the leading edge there forms a portion 26, which runs obliquely in relation to the radial direction and comprises a curved transition region 261 to the actual leading edge 23 and also a region 262 which adjoins the curved transition region 261, runs substantially in a straight line and extends as far as the tip 24.

On account of the material cutout 25, the rotor blade 22 of the second group has less material compared to the rotor blade 21 of the first group, and in the transition region from the blade leading edge 23 to the tip 24 has a different shape or contour to the rotor blade 21, and therefore the rotor blade 22 of the second group has different natural frequencies compared to the rotor blade 21 of the first group, i.e. different values of the fundamental vibration modes. The rotor blades 21, 22 are mistuned in relation to one another.

FIG. 4 schematically shows three different embodiments of rotor blades in the transition region from the blade leading edge 23 to the tip 24. The three embodiments correspond to three different groups of rotor blades which the rotor in the case of this exemplary embodiment has, and are denoted hereinbelow by A, B and C. Embodiment A represents the nominal state, i.e. the embodiment in which the rotor blade does not have a material cutout. According to embodiment A, the leading edge 23 and the tip 24 converge in an acute manner at a point D2 (or at an edge when considered three-dimensionally). Embodiment A represents the reference for the further embodiments shown.

Embodiment B provides a material cutout 25 in the transition from the blade leading edge 23 to the tip 24, this corresponding substantially to the triangle with the corner points D1, D2, D3. The exact shape of the blade leading edge 26 in the region of the cutout 25 corresponds to the shape described with reference to FIG. 3. Accordingly, in the region of the cutout 25, the leading edge comprises a curved transition region 261 and a region 262 running in a straight line. The area which is cut out in the side view shown is defined by the point of intersection between the straight line 51 and the leading edge 23 and the tip 24. In this case, the straight line 51 runs parallel to the region 262 running in a straight line, and is slightly offset in relation thereto, in order to additionally take into consideration the area in the transition region 261.

Embodiment C is defined by the straight line 52, the profile of which corresponds substantially to the profile of the leading edge in this embodiment, where strictly speaking provision is made in turn of a transition region and a region running substantially in a straight line (not shown). The cut-out area is substantially the same as in embodiment B, this not necessarily being the case. The material cutout 25' in embodiment C is defined by the triangle with the corner points D4, D2, D5.

In embodiment B, the leading edge runs in a significantly steeper manner with respect to the radial direction in the region of the material cutout 25 than in the region of the material cutout 25' in embodiment C. In both embodiments B, C, the material cutouts 25, 25' approximately have the shape of a triangle in side view, with the longest side of the triangle forming the leading edge of the blade in the region of the material cutout of 20, 25'.

FIG. 4 thus schematically shows rotor blades A, B, C of a rotor which form three different structural groups. Two of these groups have material cutouts 25, 25' in the transition from the blade leading edge 23 to the tip 24, with the material cutouts differing in their shape or orientation and accordingly the contour of the blades differing in the region of the material cutouts 25, 25'.

On the basis of exemplary embodiments, FIG. 5 shows that it can additionally be provided that the rotor blades have a leading edge shape or a leading edge profile differing from the rest of the leading edge shape in the region of the material cutouts. In this respect, in the left-hand region, FIG. 5 shows, as an overview illustration, a profile section through a rotor blade 22. The profile section is made at a radial height in which a material cutout is realized in the transition from the blade leading edge to the tip, and therefore the leading edge 26 in the region of the material cutout is illustrated in the sectional illustration shown.

FIG. 5 shows three possible different shapes or profiles of the leading edge in the region of the material cutout. According to a first variant, the leading edge 31 has a semicircular form in the region of the material cutout. According to a second variant, the leading edge 32 has an obtuse form in the region of the material cutout, i.e. it substantially forms an impingement surface for the inflowing air. According to a third variant, the leading edge 33 has an elliptical form in the region of the material cutout, with the shape of the ellipse being determined by the ratio of major axis a to minor axis b. In this case, the leading edge is of elliptical form, for example, in the region outside the material cutout in all three variants.

It is pointed out that the different shapes 31, 32, 33 of the leading edge in the region of a material cutout are not necessarily all realized in a specific rotor. Thus, it can be provided in first exemplary embodiments that the groups of rotor blades having material cutouts all have the same shape of the leading edge, for example the shape 31, the shape 32 or the shape 33. In second exemplary embodiments, it can be provided that different groups of rotor blades having material cutouts also realize different shapes of the leading edge, for example that a first group of rotor blades having material cutouts forms the shape 31 and a second group of rotor blades having material cutouts forms the shape 33.

A further embodiment provides that the shape of the leading edge changes in the radial direction in the region of a material cutout, that for example the elliptical shape 33 assumes an increasingly flatter shape in the direction to the tip 24, where flatter means that the ratio of major axis a to minor axis b becomes greater.

It can also be provided that the leading edge shape is selected depending on the steepness of the cut-back section of the leading edge in the region of the material cutout, in which case it can be provided, for example, that a lesser steepness of the leading edge in the region of the material cutout is accompanied by a flatter leading edge shape.

FIG. 6 refers to a rotor having 25 blades which form 14 different designs or groups of rotor blades. A high number of groups of rotor blades is therefore realized. The graph in FIG. 6 specifies, for each blade, the associated mistuning pattern corresponding to a specific design.

The production of such a rotor is complex, since a multiplicity of different designs have to be realized. From a manufacturing point of view, it may be advantageous to reduce the number of different blades instead of providing fine-pitch variations in the blade airfoil geometry, e.g. for only three different blade shapes. The distribution of the three different blade airfoil geometries (A, B, C) is derived, e.g., by a discrete optimization or by reducing the existing variations on the basis of the frequency variation which is set. FIG. 6 illustrates a possible depiction of the various mistuning patterns or designs on three determination patterns A, B, C.

FIG. 7 corresponds to FIG. 6, with FIG. 7 referring to a rotor having an even number of blades, comprising 26 blades which form 14 different designs or groups of rotor blades. Here, too, it may be advantageous from a manufacturing point of view to reduce the different blades to three blades A, B, C.

The present invention is not limited in its embodiment to the exemplary embodiments described above. In particular, the shape of the material cutout described in the figures and the resulting contour of the leading edges of the rotor blades are to be understood merely as exemplary. It is also pointed out that, although the invention has been described on the basis of a rotor of a turbofan engine, the principles of the present invention similarly apply to any other rotor of a turbomachine.

Moreover, it is pointed out that the features of the individual exemplary embodiments of the invention which have been described can be combined with one another in various combinations. Where ranges are defined, these encompass all values within said ranges and also all partial ranges which fall within a range.

The invention claimed is:

1. A rotor of a turbomachine, comprising:
   a plurality of rotor blades, each including a blade leading edge and a tip,
   the plurality of rotor blades forming a first group and at least one further group of rotor blades of different construction,
   wherein
   the rotor blades of the first group are nominal rotor blades,
   the rotor blades of the at least one further group each have a material cutout in a transition from the blade leading edge to the tip, the material cutout being omitted in the rotor blades of the first group, and
   the rotor blades of the first group and the at least one further group form a non-periodic sequence in a circumferential direction;
   wherein, in the rotor blades with material cutouts, a cross-sectional shape of the blade leading edge as viewed in a radial direction in a region along the material cutout deviates from a cross-sectional shape of the blade leading edge as viewed in the radial direction in a region outside the material cutout;
   wherein the blade leading edge has an obtuse form in the region along the material cutout, and an elliptical form in the region outside the material cutout;
   or wherein the blade leading edge has an elliptical form in the region along the material cutout and in the region outside the material cutout, a ratio of major axis to minor axis being greater in the region along the material cutout than in the region outside the material cutout.

2. The rotor according to claim 1, wherein the rotor blades form two groups of different construction, the rotor blades of the first group being the nominal rotor blades and the rotor blades of the at least one further group being the second group.

3. The rotor according to claim 1, wherein the rotor blades form n groups, n≥3, of different construction, the rotor blades of the first group being the nominal rotor blades, and the rotor blades of each further group of the at least one further group being rotor blades which have material cutouts in the transition from the blade leading edge to the tip, with at least one chosen from a shape and a dimension of the material cutout of the rotor blades being different in each further group.

4. The rotor according to claim 3, wherein the further groups with material cutouts differ by having, with respect to the radial direction, a differently steep profile of the blade leading edge in the region along the material cutout.

5. The rotor according to claim 4, wherein the rotor blades form three groups of different construction, the rotor blades of the first group being the nominal rotor blades and the rotor blades of a second group and a third group being rotor blades which have material cutouts in the transition from the blade leading edge to the tip, the material cutouts, with respect to the radial direction, having a steeper profile of the blade leading edge in the rotor blades of the second group than in the rotor blades of the third group.

6. The rotor according to claim 1, wherein the material cutouts are at least approximately triangular shaped in side view, with a longest side of the triangle forming the blade leading edge of the rotor blade in the region along the material cutout.

7. The rotor according to claim 1, wherein, where there are two groups of rotor blades with material cutouts, a flatter blade leading edge shape is formed in one of the two groups which has a lesser steepness profile of the blade leading edge in the region along the material cutout.

8. The rotor according to claim 1, wherein the blade leading edge has a semicircular form in the region along the material cutout, and an elliptical form in the region outside the material cutout.

9. The rotor according to claim 1, wherein the blade leading edge has an obtuse form in the region along the material cutout, and an elliptical form in the region outside the material cutout.

10. The rotor according to claim 1, wherein the blade leading edge has an elliptical form in the region along the material cutout and in the region outside the material cutout, a ratio of major axis to minor axis being greater in the region along the material cutout than in the region outside the material cutout.

11. The rotor according to claim 1, wherein, where there is at least one group of rotor blades with material cutouts, the shape of the blade leading edge becomes increasingly flatter with an increasing radial height in the region along the material cutout.

12. The rotor according to claim 1, wherein the plurality of rotor blades is an uneven number of rotor blades, with a non-periodic sequence of the plurality of rotor blades being formed by a quasi-periodic sequence which is periodic apart from a break in symmetry.

13. The rotor according to claim 1, wherein the rotor has two groups of rotor blades and the plurality of rotor blades is an even number of rotor blades, with a non-periodic sequence of the rotor blades being formed by at least one deviation from an alternating sequence.

14. The rotor according to claim 1, wherein the rotor has a BLISK configuration.

15. The rotor according to claim 1, wherein the rotor is a fan having a BLISK configuration.

16. The rotor according to claim 1, wherein the rotor is a rotor of a compressor input stage of a compressor, with the rotor having a BLISK configuration.

17. A turbofan engine having a rotor according to claim 1.

18. A rotor of BLISK configuration of a turbomachine, comprising:
an uneven number of rotor blades, each including a blade leading edge and a tip,
the rotor blades forming a first group and at least one further group of rotor blades of different construction,
the rotor blades of the first group being nominal rotor blades,
the rotor blades of the at least one further group each having a material cutout in a transition from the blade leading edge to the tip, the material cutout being omitted in the rotor blades of the first group, and
the rotor blades of the first group and the at least one further group forming a non-periodic sequence in a circumferential direction;
wherein, in the rotor blades with material cutouts, a cross-sectional shape of the blade leading edge as viewed in a radial direction in a region along the material cutout deviates from a cross-sectional shape of the blade leading edge as viewed in the radial direction in a region outside the material cutout;
wherein, where there is at least one group of rotor blades with material cutouts, the shape of the blade leading edge becomes increasingly flatter with an increasing radial height in the region along the material cutout.

19. A rotor of BLISK configuration of a turbomachine, comprising:
a plurality of rotor blades, each including a blade leading edge and a tip,
the plurality of rotor blades forming a first group and at least two further groups of rotor blades of different construction,
the rotor blades of the first group being nominal rotor blades,
the rotor blades of the at least two further groups each having a material cutout in a transition from the blade leading edge to the tip, the material cutout being omitted in the rotor blades of the first group,
the rotor blades of the first group and of the at least two further groups forming a non-periodic sequence in a circumferential direction, and
wherein, in the at least two further groups of rotor blades with material cutouts, the blade leading edge, with respect to a radial direction, has a differently steep profile in a region along the material cutout than in a region outside the material cutout;
wherein, where there are two groups of rotor blades with material cutouts, a flatter blade leading edge shape is formed in one of the two groups which has a lesser steepness profile of the blade leading edge in the region along the material cutout.

* * * * *